United States Patent [19]

Miki et al.

[11] Patent Number: 5,214,781
[45] Date of Patent: May 25, 1993

[54] METHOD OF MANAGING STORAGE MEDIUM

[75] Inventors: Tadashi Miki, Osaka; Masayuki Kozuka, Moriguchi, both of Japan

[73] Assignee: Matsushita Electric Industrial Co., Ltd., Osaka, Japan

[21] Appl. No.: 773,993

[22] Filed: Oct. 9, 1991

Related U.S. Application Data

[63] Continuation of Ser. No. 382,206, Jul. 20, 1989, abandoned.

[30] Foreign Application Priority Data

Jul. 25, 1988 [JP] Japan .................. 63-184914

[51] Int. Cl.⁵ .................................. G06F 15/40
[52] U.S. Cl. .................... 395/600; 369/59; 364/DIG. 1; 364/222.82; 364/283.1
[58] Field of Search ... 364/200 MS File, 900 MS File, 364/ DIG. 1, DIG. 2; 369/59; 395/600

[56] References Cited

U.S. PATENT DOCUMENTS

| | | | |
|---|---|---|---|
| 4,084,231 | 4/1978 | Capozzi et al. | 364/200 |
| 4,536,837 | 8/1985 | Olson et al. | 364/200 |
| 4,682,305 | 7/1987 | Ishikawa | 364/900 |
| 4,733,386 | 3/1988 | Shimoi | 369/59 |
| 4,734,901 | 3/1988 | Murakami | 369/59 |
| 4,748,611 | 5/1988 | Tsuyoshi et al. | 369/59 |
| 4,757,438 | 7/1988 | Thatte et al. | 364/200 |
| 4,761,772 | 8/1988 | Murakami . | |
| 4,775,969 | 10/1988 | Osterlund | 364/200 |
| 4,792,937 | 12/1988 | Picard | 369/59 |
| 4,947,367 | 8/1990 | Chang et al. | 364/900 |
| 4,974,197 | 11/1990 | Blount et al. | 364/900 |
| 5,029,125 | 7/1991 | Sciupac | 364/900 |

*Primary Examiner*—David L. Clark
*Assistant Examiner*—John C. Loomis
*Attorney, Agent, or Firm*—Stevens, Davis, Miller & Mosher

[57] ABSTRACT

A system is provided for managing a storage medium on which management information, data and associated history information are recorded. The system packs and records history information pieces, which have been recorded on a plurality of sectors, on a single physical sector, or the management information is backed up at a predetermined time point, so as to reduce overhead required for reproduction of the history information during reconstruction of the management information and to speed up the reconstruction processing of the management information. Particularly, achievable high-speed processing for reconstruction of the management information during initialization leads to efficient management of an external storage unit of a document filing system or a computer using the management system.

3 Claims, 7 Drawing Sheets

METHOD OF MANAGING STORAGE MEDIUM

This application is a continuation of application Ser. No. 07/382,206, filed Jul. 20, 1989 now abandoned.

BACKGROUND OF THE INVENTION

This invention relates to a storage medium utilized as an external storage unit of a computer and more particularly to a method of managing data in a storage medium having a latency time and seek time which affect access speed.

In the past, a rewritable magnetic storage medium such as an floppy disc has been utilized as external storage unit but recently a write-once type medium such as in write-once type optical disc has been gaining a use. Especially, in this type of portable medium, information necessary for managing data in the medium is often recorded, along with the data, on the storage medium to take advantage of portability of the medium.

Concomitantly with renewal of data such as addition of data, management information associated with the data is renewed frequently and if the medium is rewritten with the whole of the renewed management information each time renewal occurs, efficiency of use of the capacity of the medium will be degraded. As a countermeasure, a management system is generally used in which upon renewal of management information, only renewal history information indicative of the changed contents or differential information representative of a renewed portion is recorded on the medium and is read, during initialization in the event of exchange of the medium, from the medium so as to reconstruct the latest management information in an internal storage (a memory or a memory used in combination with an auxiliary storage medium) by looking up the contents of the renewal history information or the differential information.

Occasionally, the above management system may also be applied to, in addition to the write-once type medium, a medium such as a rewritable optical disc which tends to degrade through frequent rewriting. Examples of management schemes using the renewal history information described above will now be discussed for reference purposes.

(1) Exchange Section Scheme

This scheme is a compatible scheme which allows the operating system to handle a write-once type storage medium in a similar way of handling a magnetic medium by bringing the management system for the magnetic medium in the write-once type storage medium.

As an example, the exchange sector scheme may be packaged in a general-purpose operating system such as an MS-DOS (registered trade mark: an operating system developed by Microsoft Inc. Co.). In MS-DOS, the magnetic medium is divided into blocks each having a fixed physical size and called a cluster, and the condition of use in each cluster and continuity of data between clusters are managed by means of a file allocation table (FAT). The MS-DOS commands a cluster number allotted to a cluster when performing recording and reproduction on and from the magnetic medium. In the exchange sector scheme, management information is provided as a conversion table which records the correspondence relationship between each cluster number and a recording sector on the optical disc, and the conversion table is written in the memory during initialization and then used for management.

When the MS-DOS issues a cluster number as a reproduction command, a sector on the optical disc at which data is actually recorded is read by looking up the conversion table. When a command is issued to rewrite a cluster at which data has already been recorded, a new exchange sector is allotted to the optical disc and recorded thereon, and the conversion destination corresponding to the cluster in question and described in the conversion table in the memory is rewritten into the new sector. At the same time history information indicative of the change in the conversion table is recorded on the storage medium.

(2) HSF Compatible Scheme

In the management system for a reproduction only optical disc, there is available a HSF (High Sierra format: reference literature "Standard ECMA-119 volume and file structure of CD-ROM for information interchange). The HSF is a standard logic format for a 5.25-inch reproduction only optical disc (CD-ROM) and it takes charge of the management of directory structure using a directory file as well as a collective management table for directory called a pass table in consideration of a delay due to seek time of the CD-ROM.

A compatible scheme has been proposed which realizes compatibility of a file system of the HSF with a write-once optical disc (reference literature: NIKKEI Electronics "Host level format of optical disc, Challenge to standardization", Jul. 25, 1988). In the proposed scheme, the pass table serving as management information is reconstructed in the memory during initialization and used for management, and information indicative of a change in the pass table is recorded as history information on the write-once type optical disc.0232

(3) Management scheme for document data using retrieval information

In a document filing system using a write-once type storage medium, a management scheme is employed wherein document data is registered in the optical disc and at the same time retrieval information, such as key words added to documents, is recorded on the optical disc, and the documents are managed using the retrieval information as the management information.

In this scheme, an index is reconstructed from retrieval information and loaded on the memory during initialization and the index is then used for management of document data. Information concerning a change in and a deletion of the retrieval information after initialization is recorded on the medium to provide history information indicative of the contents of the change in the retrieval information.

However, the aforementioned renewal methods using the history information have disadvantages as will be described below The history information or the differential information is recorded each time renewal occurs and information pieces are recorded at different timings. Therefore, in a storage medium having the ability to record the unit of physical sector only, especially, a write-once type storage medium incapable of being rewritten, a great number of physical sectors on which history information pieces are recorded are dispersed on the medium.

In the conventional schemes, all of many physical sectors recording history information pieces must be read during initialization and this adversely affects or greatly prolongs the time for reconstruction processing of management information during initialization especially when a medium of low seek time such as an optical disc is used.

A countermeasure for minimizing the dispersion problem has been proposed wherein history information pieces stemming from several renewals are temporarily stored on an internal storage in the form of, for example, a semiconductor memory and just before exchange of the storage medium, the history information pieces which have been stored in the semiconductor memory are recorded on a storage medium currently used, and as a result, the number of physical sectors for recording effective history information only at a stroke can be reduced. In this proposal, however, the latest management information and associated history information in the internal storage are not reflected upon or recorded on the storage medium in the event of accidental system down or disconnection of power supply. Consequently, a discrepancy occurs between data in the storage medium and management information, and reading of data is prevented during subsequent use, thus impairing reliability and practicability.

SUMMARY OF THE INVENTION

An object of this invention is to provide a method which can reduce overhead required for reading history information during reconstruction of management information to speed up reproduction processing of the management information, by packing history information pieces indicative of the contents of renewal which have been recorded on a plurality of sectors and by recording the packed history information pieces on a single physical sector, or by backing up the management information at a predetermined time point.

According to the invention, to accomplish the above object, a method of managing a storage medium adapted to record data, management information and associated renewal history information uses a storage medium control unit for performing recording and reproduction on and from the storage medium, a converter/loader for reconstructing management information by using history information, an internal storage for storing the reconstructed management information loaded from the converter/loader, a data manager for commanding recording and reproduction of data by using the management information, and a renewal processor for processing the management information, so as to cause the renewal processor to pack history information pieces which have been recorded on a plurality of physical sectors to re-record the packed history information pieces on a single sector.

In an alternative embodiment, the renewal processor may record the reconstructed management information on the storage medium at a predetermined time point to provide a backup record, and the converter/loader may begin with the backup management information to reconstruct the latest management information on the basis of history information occurring after the backup.

DESCRIPTION OF THE PREFERRED EMBODIMENTS

In describing the present invention by way of example, embodiment, while 1 is directed to a general embodiment in embodiment 2 the invention is particularly applied to the "(2) HSF compatible scheme".

Embodiment 1

Figure 1:
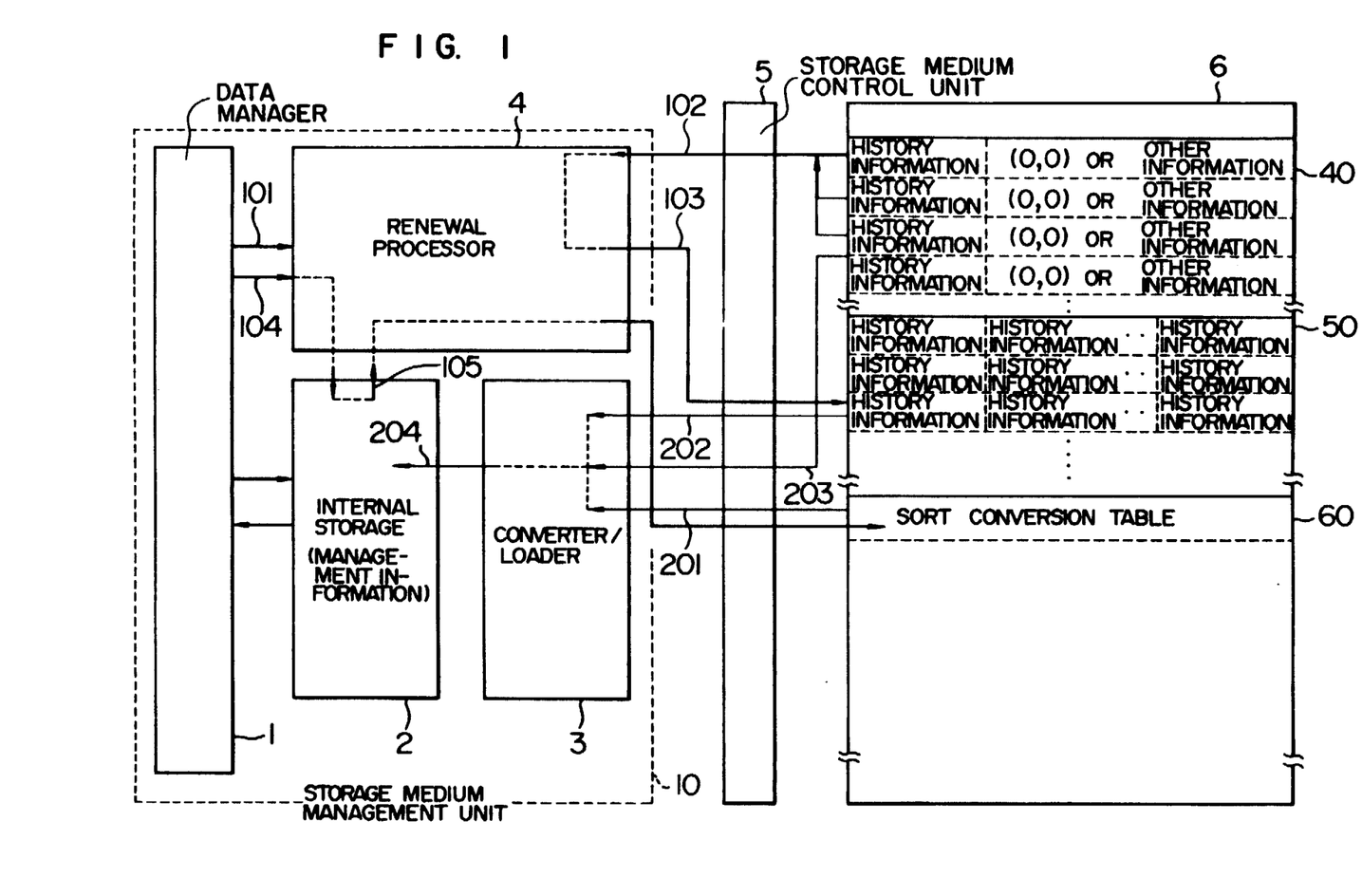
FIG. 1 is a block diagram illustrating the fundamental construction of a storage medium management system embodying the invention.
Figure 2:
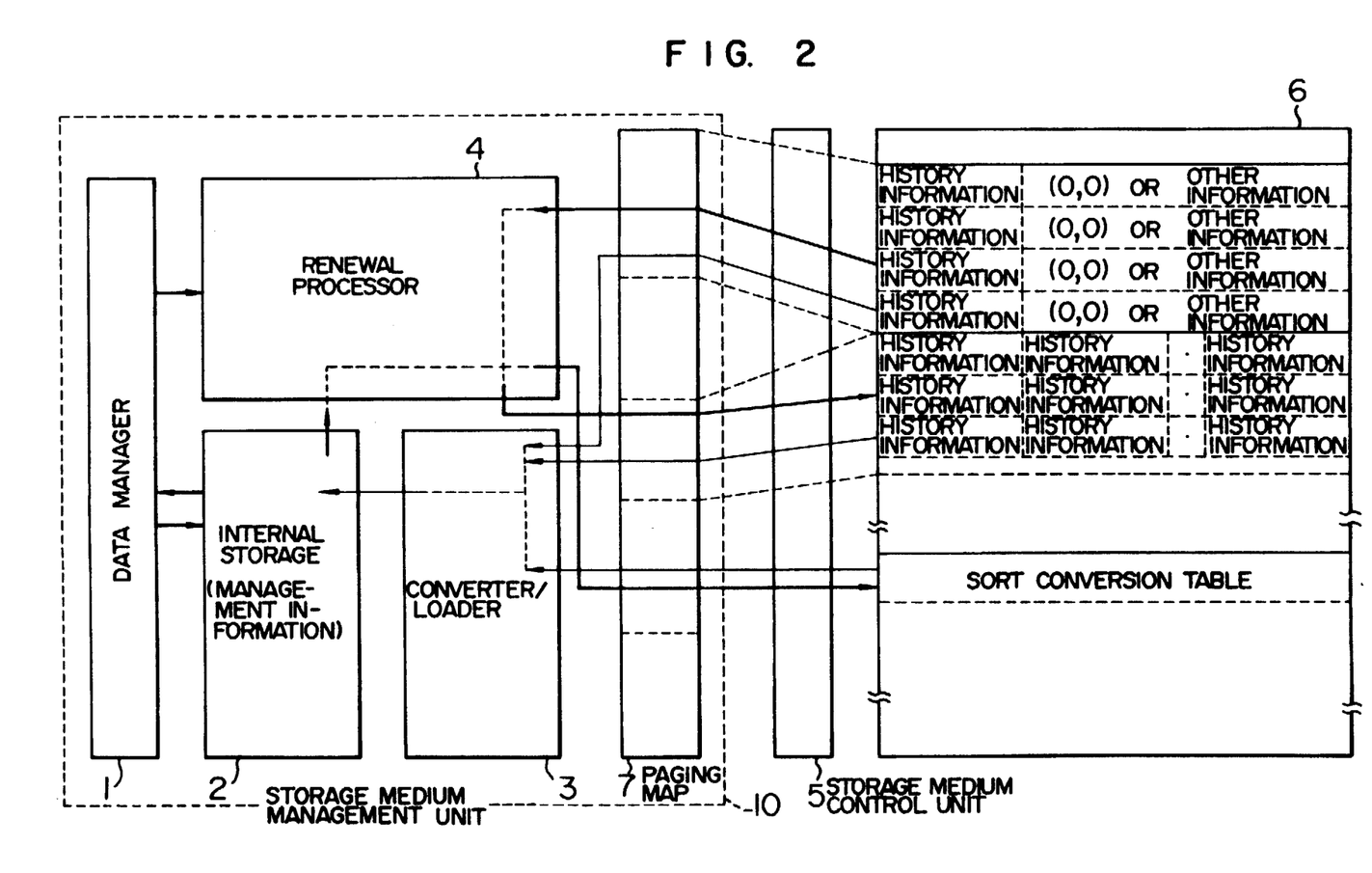
FIG. 2 is a block diagram showing a modification of the FIG. 1 system using a paging map.

This embodiment is fundamentally constructed as shown in FIG. 1 and FIG. 2 and will be described with reference to FIGS. 1 to 5.

Referring to FIG. 1, a storage medium management unit 10 includes a data manager 1 and an internal storage 2 for storing management information which manages data in a storage medium. Normally, the internal memory is used as the internal storage but especially where the size of the management information is large, the internal storage may sometimes be used in combination with an auxiliary storage medium for swapping, such as a hardware disc. The management information and history information associated therewith are recorded on the storage medium. The management unit 10 also includes a converter/loader 3 for reading the management information and its history information from the storage medium and loading reconstructed information on the internal storage 2, and a renewal processor 4 operable to provide a packed form record of history information pieces which have been dispersed to a plurality of sectors and recorded thereon. A storage medium control unit 5 controls recording and reproduction on and from the recording medium. The storage medium, designated by reference numeral 6, has its internal data location as shown. Specifically, in the storage medium 6, individual history information pieces are recorded on physical sectors schematically shown at 40 and a packed form of the history information pieces is recorded on a physical sector schematically shown at 50. These physical sectors will be described later with reference to FIGS. 3 and 4. In FIG. 1, thick solid lines (101 to 106) indicate flows of commands and data in the mode wherein the renewal processor 4 operates for packing history information pieces, and thin solid lines (201 to 204) indicate flows of data in the mode of initialization wherein the converter/loader 3 reconstructs the management information. These flows will be described later by making reference to flow charts of FIGS. 6 and 7.

The above management system can be applied to a storage medium in the form of a write-once type optical disc to attain great effect and therefore the present embodiment will hereunder be described as applied to this type of storage medium 6.

Figure 3:
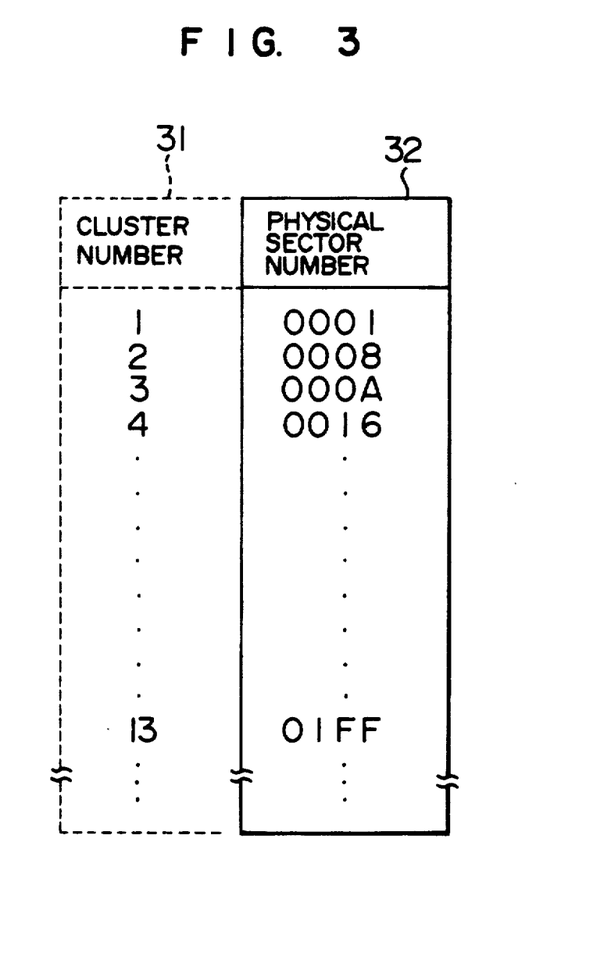
FIG. 3 is a diagram showing an example of management information used in the exchange sector scheme.
Figure 4:
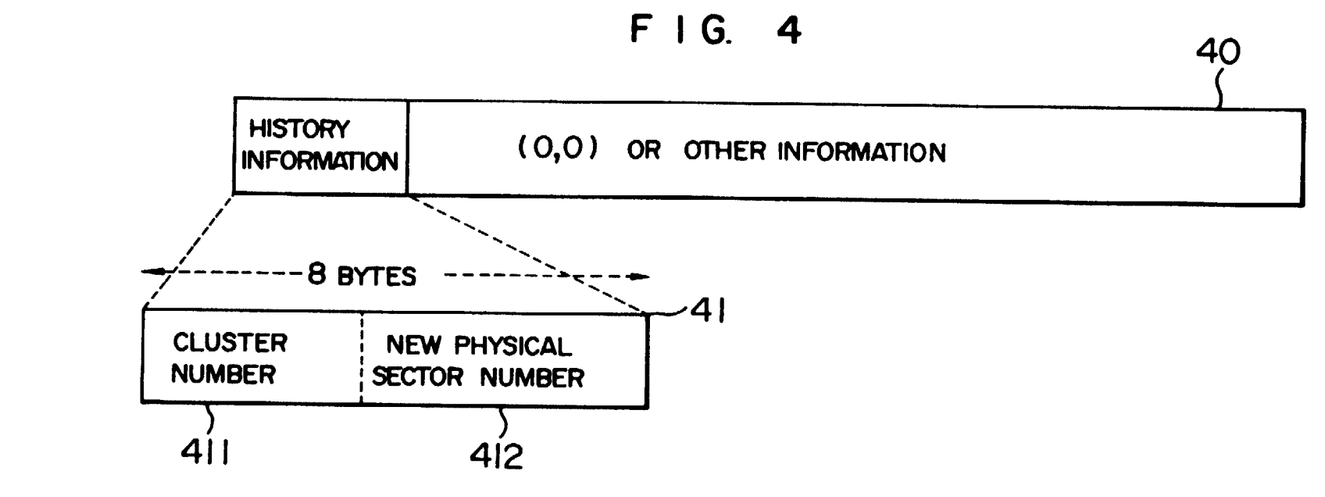
FIG. 4 is a schematic diagram of a physical sector on which each history information is recorded.

FIG. 3 shows an example of management information compatible with the exchange sector scheme (hereinafter simply referred to as a conversion table), and FIG. 4 schematically shows each history information piece recorded on a physical sector 40. Referring to FIG. 3, the conversion table contains a cluster number column 31 and a physical sector number column 32 and during initialization, this conversion table is reconstructed as the latest form and loaded on the internal storage 2. Contained in the cluster number column 31 are logical addresses by which the data manager 1 identifies recording commands sent to the optical disc 6, and contained in the physical sector number column 32 are recording sector numbers representative of actual addresses on the optical disc. When the size of a cluster is larger than that of a physical sector, the history information are recorded on a continuous physical sectors which size of then in all corresponds to that of a cluster. FIG. 3 examplifies that actual recording of the contents of cluster number 13 begins with physical sector number 01FF. A reproduction command issued from the data manager 1 is converted into a physical sector number in the column 32 by looking up the conversion table and an actual recording location is accessed by using that physical sector number. When a command is given for rewriting a cluster number which has already been recorded, a new physical sector is allotted to the optical disc and the conversion table in the internal storage 2 is rewritten such that the cluster number of interest in the conversion table designates the new physical sector number. Then, history information indicative of the rewritten contents of the conversion table is recorded on the optical disc 6. For example, the history information has a format 41 shown in FIG. 4 wherein 411 designates a cluster number subject to the rewrite command and 412 a new physical sector number. In this manner, updating is carried out so as not to renew records on the entire conversion table but so as to record only the history information. This permits the latest conversion table to be reconstructed on the basis of the history information during initialization.

Since the conversion table per se is managed to take the latest status in the internal storage 2, the conversion information is not always required to be recorded on the storage medium 6 each time a change is needed but may be recorded collectively in the event of exchange of the storage medium 6 or of power-down of the system power supply. But when such an accident as fault of the system or disconnection of the power supply occurs, the conversion table in the internal storage 2 is not reflected on the optical disc and a discrepancy occurs between data in the optical disc and management information, with the result that reading of the storage medium is prevented during the subsequent use, thus impairing reliability. Therefore, to avoid the above problems, the general system is based on a scheme wherein the conversion table in the internal storage is renewed and at the same time history information is recorded on the optical disc. However, information is written into the ordinary optical disc in units of physical sector and therefore history information pieces are dispersed to individual physical sectors and recorded thereon, raising problems to be described below.

Where history information pieces are recorded with dispersal to many physical sectors, the number of sectors to be read upon reconstruction of the conversion table during initialization increases to a great extent and degradation or prolongation of the processing time results. Especially, in the storage medium such as an optical disc which is considered to need more access time than other storage media on account of a delay due to latency time and seek time, overhead required for reading a great number of sectors increases considerably. If sectors on which history information pieces are recorded lie continuous or adjacent to one another, overhead for reading can be reduced slightly by reading a plurality of sectors at a time. But this method requires a large-capacity memory for buffering, and occasionally, a constraint imposed by the use of the memory makes it difficult to employ the method and restricts the results of the method In the present embodiment, the decrease in processing speed can be prevented by collectively recording individual history information pieces, which have been dispersed to a plurality of physical sectors and recorded thereon, on a single physical sector (hereinafter referred to as a packed history information sector).

Figure 5:
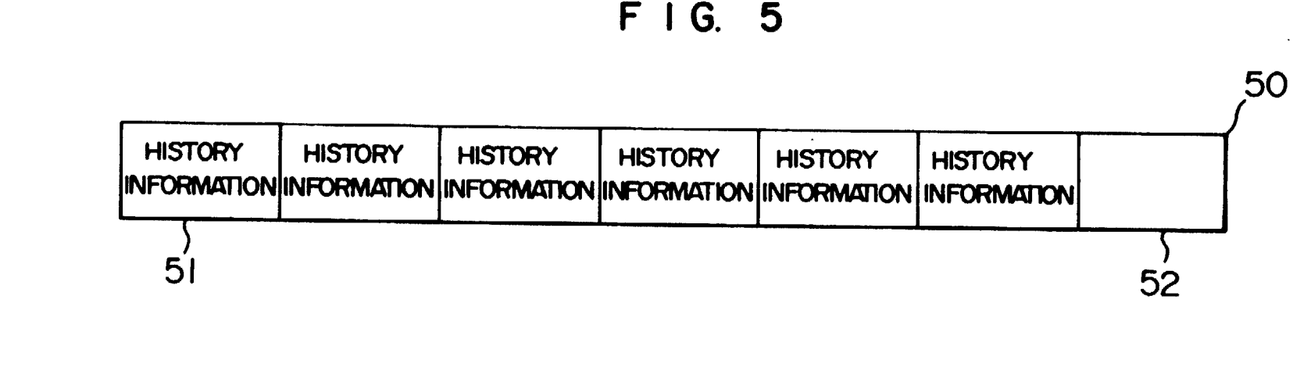
FIG. 5 is a schematic diagram showing an example of a packed history information sector.

FIG. 5 shows an example of a packed history information sector 50. As shown, history information pieces 41 which have been recorded with dispersal to a plurality of physical sectors are collectively recorded as history information pieces 51 on the packed history information sector 50 and positional information 52 representative of a physical sector number for the subsequent history information pieces is also recorded on the sector 50 (when history information pieces and packed history information sectors are to be recorded on continuous addresses and when a format is employed wherein history information contains a pointer for the subsequent history information, there is no need to provide the positional information 52).

Further, by providing a predetermined range of addresses for recording of individual history information pieces and packed history information sectors and by recording history information pieces on continuous sectors within the address range, a plurality of sectors can be read at a time to further-reduce the overhead for reading.

When the packed history information sector is used for, for example, the exchange sector scheme in this embodiment, it is sufficient that the cluster number 411 has 4 bytes, the new physical sector number 412 has 4 bytes and the history information has 8 bytes in total. Accordingly, where the physical sector of the storage medium is of 512 bytes, 60 or more history information pieces can be recorded on a single packed history information sector. Therefore, a simple calculation yields a conclusion that overhead required for reading the physical sector during initialization can be reduced to 1/60 or less.

In addition to the previously-described method wherein the packed history information sector is used, a method may be employed by which the latest conversion table reconstructed in the internal storage 2 is directly recorded on the storage medium at a predetermined time point to serve as a backing (hereinafter referred to as sort conversion table). In this case, a small amount of header information (e.g. indicating the size of the conversion table) may occasionally be added. When the conversion table is to be changed after recording of the sort conversion table, recording of history information begins with the sort conversion table.

Figure 6:
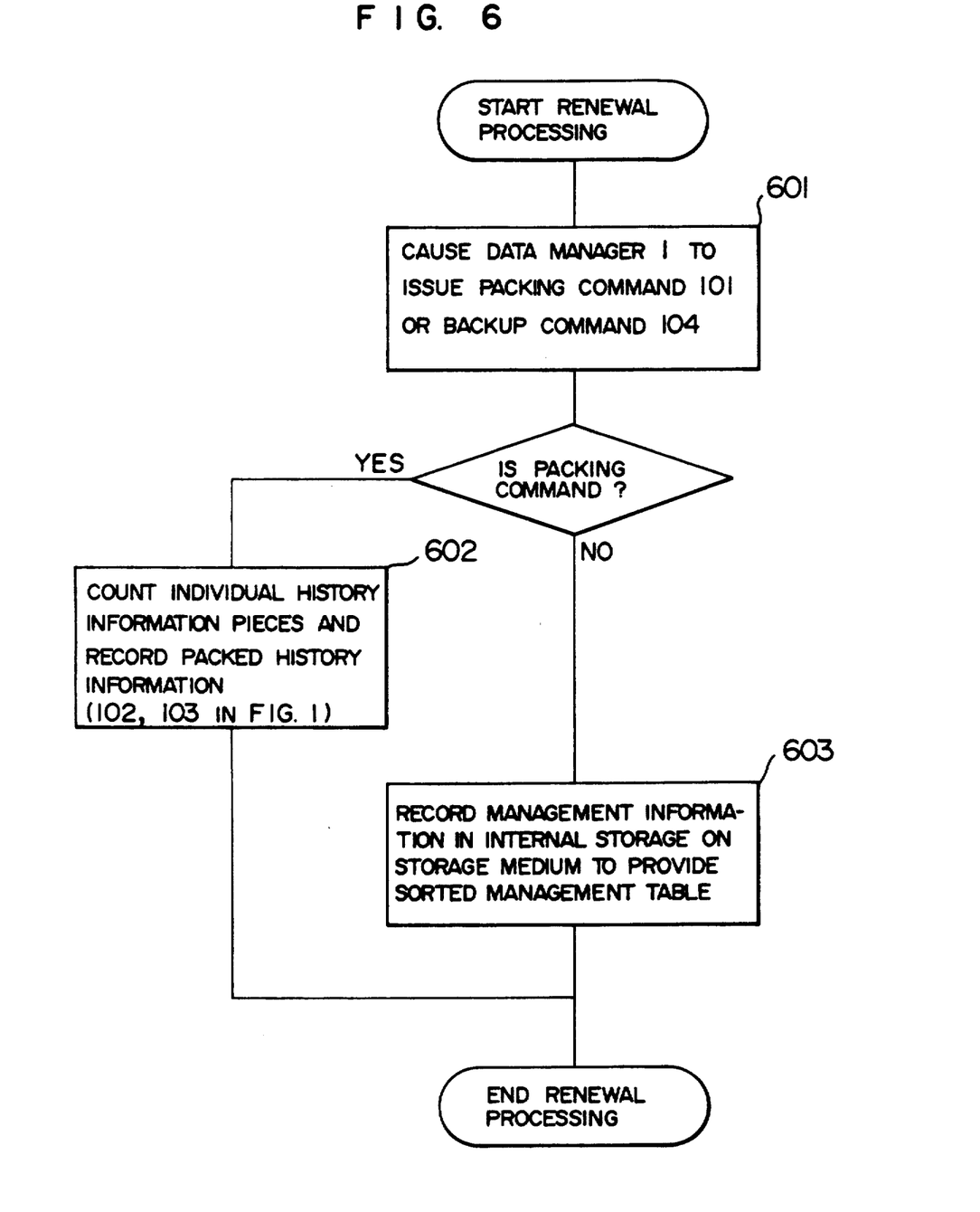
FIG. 6 is a flow chart showing algorithm for packing history information pieces.

The packing of history information and reconstruction of management information during initialization will now be described in greater detail with reference to FIG. 1 and the flow charts of FIGS. 6 and 7. In step 601 of FIG. 6, the data manager 1 considers process blank time and responds to a command from the user to issue either a command 101 for packing history information pieces or a backup command 104. In the presence of the packing command 101, the procedure proceeds to step 602 but in the presence of the backup command 104, the procedure proceeds to step 603. In the step 602, the renewal processor 4 counts the number of physical sectors occupied by individual history information pieces to prepare packed history information 50 and records the packed history information on the storage medium 6. In the step 603, the renewal processor 4 records management information currently stored in the internal storage 2 on the storage medium 6 to provide a sorted management table 60.

Figure 7:
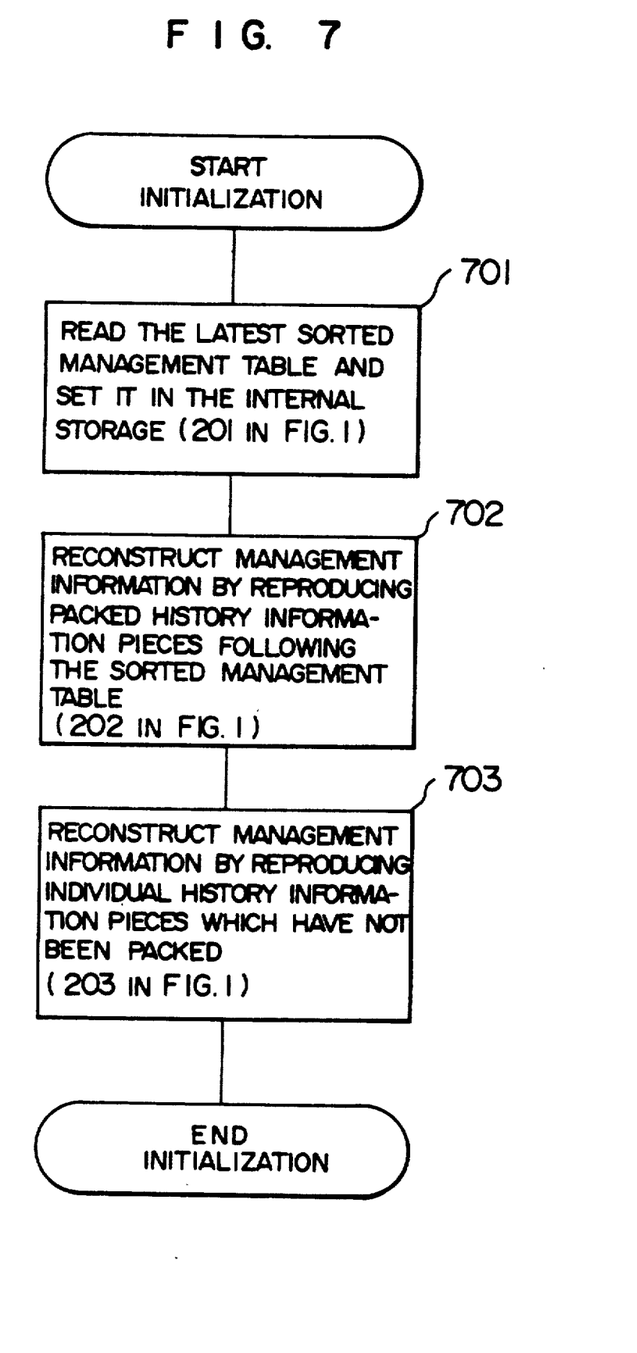
FIG. 7 is a flow chart showing algorithm for reconstructing management information during initialization.

Data is reconstructed during initialization in accordance with the flow chart of FIG. 7. In step 701, the converter/loader 3 reads the latest sorted management table 60. The procedure then proceeds to step 702. In the step 702, history information pieces 51 in the packed history information 50 recorded after recording of the latest sorted management table 60 are sequentially reproduced to reconstruct management information. The procedure then proceeds to step 703. In the step 703, individual history information pieces 40 which have not been packed yet are reproduced to reconstruct management information, thus completing the initialization.

The present embodiment may be modified as shown in FIG. 2 to include a paging map 7 by which commands to the storage medium control unit 5 are handled in the form of virtual logic addresses (cluster numbers) and virtual logic addresses are converted into actual recording locations on the storage medium. Through the use of the paging map 7, even when the recording location dedicated to the sector for recording packed history information or to the sort conversion table for recording individual history information pieces is set within a predetermined range of recording addresses (cluster numbers), there is no need to reserve, in advance, the entire set area on the storage medium. Since in this modification mapping of the area onto the optical disc can be done by changing paging dynamically in accordance with the condition of use, area management can be simplified and use of recording area can be saved. The recording address range depends on the condition of use. However, even when a rather large address range is set, saving of area can be ensured. For example, even when the recording address range for the packed history information sector is determined by setting addresses for 10000 sectors, there is no need to reserve 10000 sectors on the optical disc.

Embodiment 2

Figure 8:
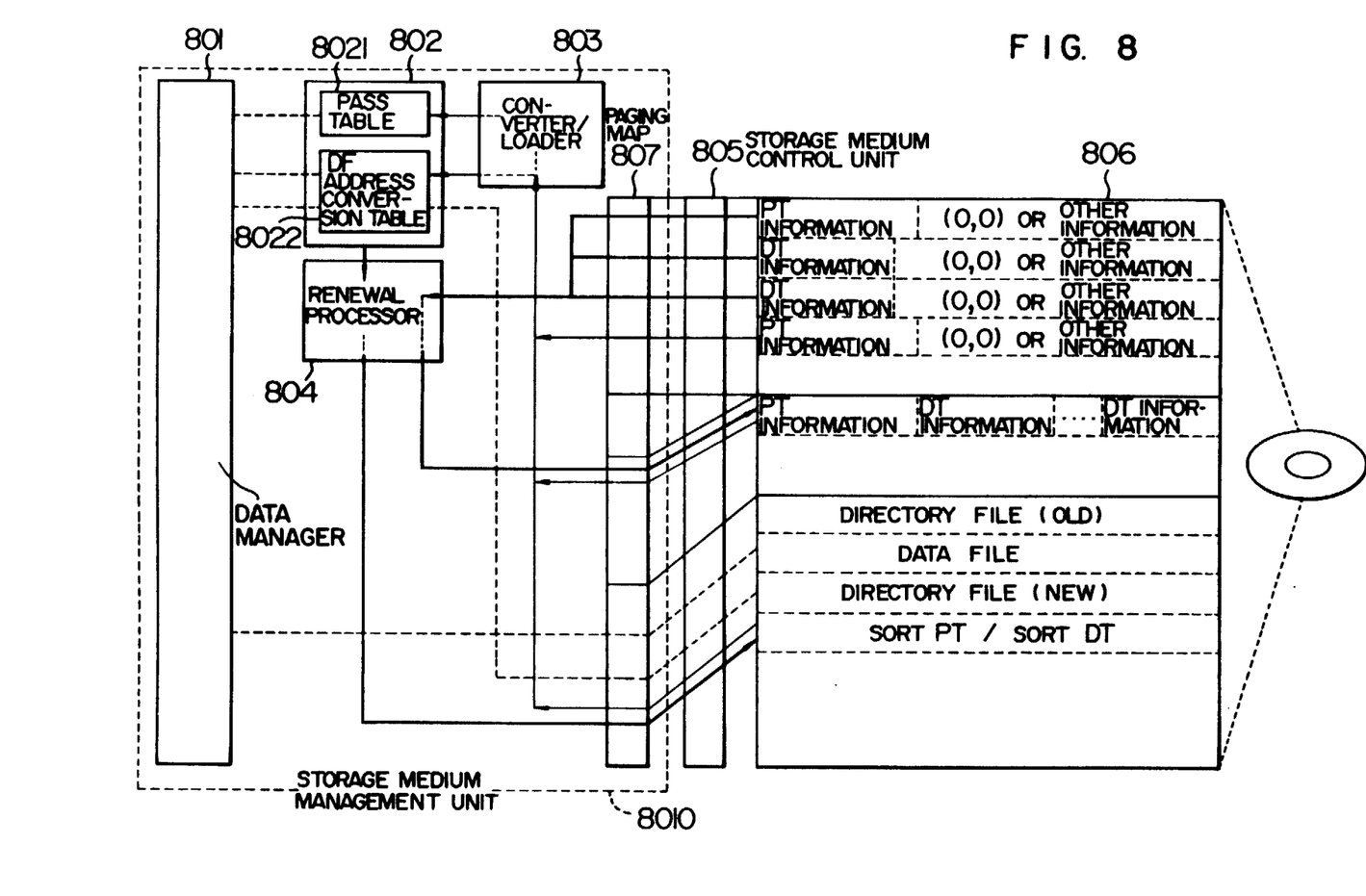
FIG. 8 is a block diagram illustrating the fundamental construction of another storage medium management system embodying the invention and applied to the HSF compatible scheme.

In embodiment 2, the invention is applied to the HSF compatible scheme and this embodiment is schematically illustrated in FIG. 8. Referring to FIG. 8, a storage medium management unit 8010 includes a data manager 801 and an internal storage 802 having a pass table (PT) 8021 representative of management information necessary for realizing compatibility with the HSF and a directory file address conversion table (DT) 8022. A converter/loader 803 reproduces the PT 8021 and DT 8022 by reading history information from an optical disc 806, a renewal processor 804 is operable to provide a collected form record of history information pieces which have been dispersed to a plurality of sectors and recorded thereon, and a storage medium control unit 805 controls recording and reproduction on and from the recording medium. The optical disc 806 is a write-once type optical disc and has its internal data location as shown. A paging map 807 is adapted to dynamically map, in units of page, logic addresses handled by storage medium management unit 8010 onto physical addresses on the optical disc. During reproduction of management information and data files, accessing is effected along paths indicated by dotted-line arrows in FIG. 8. Solid-line arrows indicate similar data flows to those in embodiment 1 shown in FIGS. 1 and 2.

The DT 8022 is a table which is introduced for the purpose of effectively performing renewal of a directory file (DF), especially, with a view to avoiding problems to be described below encountered in renewal of the DT (reference literature: NIKKEI Electronics "Host Level format of optical disc, Challenge to standardization", Jul. 25, 1988).

In the directory structure of the HSF, the DF serves to record logic block numbers representative of positional information for a master directory file and a subdirectory file. A file system of the HSF (corresponding to the reproduction processing function of the data manager 801 in FIG. 8) looks up the hierarchical structure between directories on the basis of the positional information recorded on the DF. Since the write-once type optical disc 806 is not rewritable, the DF is renewed, for example, upon addition of a file by performing an additional write on a different fresh block and therefore the address (logic block number) for the DF changes. In the DF of the HSF, however, the master directory file and the subdirectory file serve to record addresses before changing which serve as positional information for the renewed DF. Therefore, addresses recorded on the master and subdirectory files must be renewed and to this end, these files are required to be renewed sympathetically, thus disadvantageously forcing all of related directories to be renewed. To solve this problem, a virtual DF address is allotted to the DF and directories are related to each other on the basis of the virtual DF address. An actual address at which the DF is actually recorded is related to the virtual DF address by the correspondence relationship recorded on the DT 8022. In accordance with this method, even when the DF is renewed, the virtual DF address remains unchanged and therefore it is sufficient that the address on the DT 8022 is simply rewritten so as to designate an address at which a renewed DF is recorded, thereby avoiding the above problem and realizing renewal of the DF efficiently.

Renewal of PT and DT serving as management information necessary for addition of files and directory preparation are done by renewing the DT 8022 and PT 8021 in the internal storage 2, and at the same time history information is recorded on the optical disc 806. In FIG. 8, PT information indicates history information associated with PT and DT information indicates history information associated with DT. During initialization, the converter/loader 803 must read a great number of sectors on which history information pieces for the two tables are recorded so as to reconstruct the DT 8022 and PT 8021, and the overhead is increased disadvantageously as in the case of embodiment 1 of the exchange sector scheme.

In this embodiment, however, the renewal processor functions to pack history information pieces for the two tables which have been recorded on individual blocks and record them collectively on a single sector in order to speed up the reconstruction processing of the two tables during initialization. If the history information has a flag for discriminating which table the history information belongs to, history information pieces are permitted to be dispersed within the sector. For example, the PT information representative of history information for the PT and having a relatively large amount of data and the DT information representative of history information for the DT and having a relatively small amount of data may be packed efficiently within the same sector, as shown in FIG. 8. Further, at the time that a prescribed number of history information pieces are prepared or especially a command is issued from the data manager, the contents of the PT 8021 and DT 8022 in the internal storage 802 may be recorded on the optical disc 806 to provide a record which backs up the PT 8021 and DT 8022 to further promote speed-up of the reconstruction processing. The backup record corresponds to the sort conversion table in embodiment 1.

We claim:

1. A computer data management system for a write-once type storage medium, which includes a plurality of sectors, for recording data including at least file data and file management information, wherein the recording of the data on the write-once type storage medium, including the at least file data and file management information, is performed by recording new file data on the write-once type storage, by updating a current file management information stored on a rewritable type memory, wherein said updated current file management information comprises a pointer to at least one address of the recorded new file data, and by recording a difference-information on the write-once type storage medium, wherein the difference-information comprises information which corresponds to the difference between the current file management information and the updated current file management information, said system comprising:

a) difference-information recording means for recording difference-information on at least a number of sectors of said plurality of sectors of said write-once type storage medium;

b) difference-information gathering means for reading said number of sectors of said plurality of sectors of said storage medium and extracting said difference information recorded in at least some of said number of sectors, upon each recording of a new item of said file data on said write-once type storage medium, and for gathering and recording in one sector of said plurality of sectors of said write-once type recording medium said difference-information so extracted from said number of sectors of said plurality of sectors, wherein a record size of a sum of said difference information so extracted is smaller than a size of said one sector of said plurality of sectors; and c) converter/loader means for reconstructing said current file management information stored on said rewritable type memory by reading and storing in said rewritable type memory all of said difference information included in said one sector of said plurality of sectors and included in any ones of said number of sectors including said difference information that were recorded by said difference information recording means but were not gathered or recorded by said difference-information gathering means, at least at a time when said computer system is powered on or a time when said write-once type storage medium is to be ejected and exchanged for another write-once-type storage medium.

2. A computer data management system as in claim 1, further including, in combination:

d) current file management information saving means for recording said current file information stored on said rewritable type memory onto said write-once type storage medium, a least each time when a number, predefined by said system, of said number of sectors is recorded on said write-once type storage medium.

3. A computer data management system as in claim 1, wherein said difference-information gathering means record said one sector of said plurality of sectors to sequential sectors of said write-once type storage medium.

* * * * *